US012479691B2

(12) United States Patent
Nichols et al.

(10) Patent No.: US 12,479,691 B2
(45) Date of Patent: Nov. 25, 2025

(54) ELEVATOR SYSTEM

(71) Applicant: Otis Elevator Company, Farmington, CT (US)

(72) Inventors: Stephen R. Nichols, Plantsville, CT (US); Matteo Rucco, Trento (IT); Jose Miguel Pasini, Avon, CT (US); Cecilia Tonelli, Rome (IT); Andrea De Antoni, Rome (IT); David R. Polak, Glastonbury, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 1455 days.

(21) Appl. No.: 17/062,091

(22) Filed: Oct. 2, 2020

(65) Prior Publication Data

US 2021/0101776 A1 Apr. 8, 2021

(30) Foreign Application Priority Data

Oct. 4, 2019 (EP) .................................... 19201404

(51) Int. Cl.
*B66B 1/28* (2006.01)
*B66B 1/46* (2006.01)
(Continued)

(52) U.S. Cl.
CPC ................ *B66B 1/28* (2013.01); *B66B 1/468* (2013.01); *B66B 3/002* (2013.01); *B66B 5/0012* (2013.01);
(Continued)

(58) Field of Classification Search
CPC .......... B66B 1/28; B66B 1/468; B66B 3/002; B66B 5/0012
(Continued)

(56) References Cited

U.S. PATENT DOCUMENTS 5,329,076 A * 7/1994 Kameli ................. B66B 1/2458 187/383
9,856,107 B2 1/2018 Haipus et al.
(Continued)

FOREIGN PATENT DOCUMENTS

CN 101568483 A 10/2009
CN 105939950 A 9/2016
(Continued)

OTHER PUBLICATIONS

Ali et al., "Depth-based human activity recognition: A comparative perspective study on feature extraction", FutureComputing and Informatics Journal (2017), https://doi.org/10.1016/j.fcij.2017.11.002, 18 Pages.
(Continued)

*Primary Examiner* — Erick D Glass
(74) *Attorney, Agent, or Firm* — CANTOR COLBURN LLP

(57) ABSTRACT

A method of controlling operation of an elevator system (2), the elevator system (2) including a hoistway (4) extending between a plurality of landings (8) situated on different floors (9), and at least one elevator car (6) configured for moving along the hoistway (4) between the plurality of landings (8). The method includes receiving a control input indicating a passenger transport request, wherein the control input comprises at least one passenger transport request parameter; monitoring passengers (30) within or outside the elevator car (6) and determining at least one passenger parameter associated with the passengers (30); comparing the at least one passenger transport request parameter with the at least one passenger parameter; and controlling further operation of the elevator system (2) based on the result of said comparison.

14 Claims, 3 Drawing Sheets

(51) Int. Cl.
*B66B 3/00* (2006.01)
*B66B 5/00* (2006.01)

(52) U.S. Cl.
CPC ... *B66B 2201/222* (2013.01); *B66B 2201/405* (2013.01)

(58) Field of Classification Search
USPC .......................................................... 187/247
See application file for complete search history.

(56) References Cited

U.S. PATENT DOCUMENTS

| | | | | |
|---|---|---|---|---|
| 9,896,305 | B2 | 2/2018 | Blandin et al. | |
| 2004/0188185 | A1 | 9/2004 | Pieper | |
| 2008/0122969 | A1* | 5/2008 | Alakarhu | G03B 43/02 348/E5.037 |
| 2017/0327344 | A1* | 11/2017 | Richmond | B66B 1/3476 |

FOREIGN PATENT DOCUMENTS

| | | | |
|---|---|---|---|
| CN | 107609597 | A | 1/2018 |
| CN | 110104511 | A | 8/2019 |
| EP | 2163501 | A1 | 3/2010 |
| JP | H07237837 | A | 9/1995 |
| JP | 2002104746 | A | 4/2002 |
| JP | 2006168930 | A | 6/2006 |
| JP | 2015231898 | A | 12/2015 |
| WO | 2009141900 | A1 | 9/2011 |
| WO | 2013182739 | A1 | 12/2013 |
| WO | 2017140365 | A | 8/2017 |

OTHER PUBLICATIONS

European Search Report for Application No. 19201404.1; Issued Jul. 24, 2020; 9 Pages.

Harville, Michael, “Stereo person tracking with adaptive plan-view templates of height and occupancy statistics”, Image and Vision Computing 22.2 (2004), p. 127-142.

Setti et al., “Group detection in still images by F-formation modeling: a comparative study”, In Proceedings of the 2013 14th International Workshop on Image Analysis for Multimedia InteractiveServices (WIAMIS), 2013, Paris, France, Jul. 3-5, 4 Pages.

Zhang et al., “AlignedReID: Surpassing Human-Level Performance in Person Re-Identification”, Institute of Cyber-Systems and Control, Zhejiang University, arXiv preprint arXiv:1711.08184, 2017, 10 Pages.

Chinese Office Action for Application No. 202011039531.3, Issued May 25, 2022, 7 Pages.

* cited by examiner

ELEVATOR SYSTEM

FOREIGN PRIORITY

This application claims priority to European Patent Application No. 19201404.1, filed Oct. 4, 2019, and all the benefits accruing therefrom under 35 U.S.C. § 119, the contents of which in its entirety are herein incorporated by reference.

TECHNICAL FIELD OF INVENTION

The invention relates to an elevator system and to a method of moving an elevator car of an elevator system.

BACKGROUND OF THE INVENTION

An elevator system, as referred to herein, comprises at least one elevator car configured for moving along a hoistway extending between a plurality of landings. The elevator system further comprises at least one elevator drive configured for moving the at least one elevator car, and an elevator control, which is configured for controlling the movement of the at least one elevator car by controlling the operation of the at least one elevator drive.

The elevator system may be configured for being controlled applying a method which is known as "destination dispatching". When destination dispatching is applied, passengers intending to use the elevator system are requested to input their desired destinations at the landing from which they are departing before boarding an elevator car. The elevator control then assigns each passenger to one of the elevator cars and instructs the passenger to board the respective elevator car. Destination dispatching allows distributing the passengers over a plurality of elevator cars in a pattern optimizing the capacity of the elevator system and reducing the average waiting and travel times of all passengers.

In an extended version of destination dispatching, further information associated with the respective travel request may be entered in addition to the passengers' desired destinations. Such information may include the cardinality, i.e. the size of a group of passengers who like to travel together within the same elevator car. The additional information also may include an indication of a larger than usual volume occupancy of a passenger, e.g. because the passenger is traveling with a wheelchair, a bicycle, a pram, a buggy and/or extensive luggage. This allows optimizing the occupancy of the elevator cars. It in particular avoids overloading an elevator car which is intended for transporting a passenger with an increased room occupancy.

In such a configuration, the additional information input by the passengers allows optimizing the operation of the elevator system even further. It also allows enhancing the passengers' travel experiences by fulfilling individual demands of the respective passengers.

However, in such a system, there also is a risk of deteriorating the efficiency by false input.

False input may include fictitious calls, i.e. multiple calls to different destinations input by the same passenger, one or more calls entered by a passenger who then does not board an elevator car, and/or repeated calls to the same destination by the same passenger in hopes of achieving an empty elevator car or faster service. The phenomenon of passengers entering fictitious calls is also known as "gaming".

False input may also include entering false additional information associated with the respective call, such as entering a wrong cardinality of a group of passengers traveling together, and/or false volume occupancies of the passengers and their luggage.

False input may result in a plurality of adverse effects including but not restricted to: unnecessarily increased waiting times of passengers at the landings; increased crowding of passengers at some of the landings and/or in some of the elevator cars; increased traveling times inside the elevator cars; elevator cars by-passing crowded landings although there is still free space within the elevator car; and/or increased energy consumption and wear of components of the elevator system. In consequence, the efficiency of the elevator system is reduced, and the travel experience of the passengers is deteriorated.

It therefore would be beneficial to provide an elevator system and a method of controlling an elevator system which are capable of detecting false inputs and avoiding adverse effects, which may be caused by such false inputs.

SUMMARY OF THE INVENTION

According to an exemplary embodiment of the invention, a method of controlling operation of an elevator system comprising a hoistway extending between a plurality of landings situated on different floors; and at least one elevator car configured for moving along the hoistway between the plurality of landings, includes: receiving a control input, such as a destination call, indicating a passenger transport request, the control input comprising at least one passenger transport request parameter; monitoring passengers within or outside the elevator car and determining at least one passenger parameter associated with the passengers; comparing the at least one passenger transport request parameter with the at least one passenger parameter; and controlling further operation of the elevator system based on the result of said comparison.

An elevator system according to an exemplary embodiment of the invention comprises a hoistway extending between a plurality of landings situated on different floors; at least one elevator car configured for moving along the hoistway between the plurality of landings; an elevator drive configured for moving the at least one elevator car along the hoistway; and an elevator control configured for controlling operation of the elevator system by controlling the elevator drive. The elevator control is configured for controlling operation of the elevator system by applying a method according to an exemplary embodiment of the invention.

By monitoring the passengers within or outside the elevator car, determining at least one passenger parameter associated with the passengers and comparing the at least one determined passenger parameter with at least one corresponding passenger transport request parameter, false input to the elevator control may be identified and appropriate actions may be taken in order to avoid adverse effects resulting from such false inputs.

In consequence, the elevator system may be operated with high efficiency providing a pleasant travel experience to the passengers even if false inputs are provided by some of the passengers.

A number of optional features are set out in the following. These features may be realized in particular embodiments, alone or in combination with any of the other features.

In case the at least one passenger transport request parameter coincides with the at least one passenger parameter, the control input may be confirmed and the elevator system may be operated in agreement to the control input(s) provided by the passenger(s).

In case, however, the at least one passenger transport request parameter does not coincide with the at least one passenger parameter, the control input may be identified as false input, and, in consequence, the control input may be ignored.

For example, a control input entered by a passenger who does not board an elevator car may be ignored. Similarly, requests input by passengers who leave the respective landing and do not return within a predetermined period of time, may be ignored and/or deleted. As a result of ignoring such passenger requests, unnecessary stops of the elevator car at landings corresponding to such false inputs may be prevented. Similarly, requests for repeated calls to the same destination or an increased volume occupancy, which have been identified as false inputs, may be ignored in order to allow additional passengers to board the respective elevator car.

Operation of the elevator system may also include issuing an alarm if the at least one passenger transport request parameter does not coincide with the at least one passenger parameter. This in particular applies to situations in which at least one passenger, who did not enter a control input to the elevator system, boards one of the elevator cars ("piggy-backing"), and/or situations in which at least one passenger leaves the elevator car at a floor, which differs from his previously entered destination landing ("tail-gating").

An elevator system including this functionality may be used as an access system for restricting access to the different floors of a building. In such a configuration, the elevator system allows passengers to the leave the elevator car only at floors which they are authorized to enter. Optionally, additional safety doors, which are closed in case tail-gating is detected, may be provided at the landings in order to reliably prevent unauthorized passengers from entering the respective floor.

In order to reduce the risk of erroneously identifying a control input as a false input, the method may include determining the reliability of the determined passenger parameter and controlling further operation of the elevator system based on the result of the comparison only if the determined reliability exceeds a predetermined threshold. In case the reliability of the determined passenger parameter does not exceed the predetermined threshold, the determined passenger parameter is not considered as reliable enough for overturning the control input provided by the passenger(s). In consequence, the control input provided by the passenger(s) is trusted and the elevator system is operated accordingly.

The invention may include monitoring the passengers outside the elevator car and determining the at least one passenger parameter associated with said passengers based on monitoring the passengers outside the elevator car ("landing algorithm").

The method may include determining the reliability of the passenger parameter determined by the landing algorithm and controlling further operation of the elevator system based on the result of the landing algorithm only if the determined reliability exceeds a predetermined threshold.

Using the results of a landing algorithm for controlling further operation of the elevator system provides the advantage that the operation of the elevator system may be modified at an early stage, i.e. even before the monitored passengers board the elevator car. As a result, further operation of the elevator system may be optimized very efficiently.

The invention may further include monitoring the passengers inside the elevator car and determining the at least one passenger parameter associated with said passengers from monitoring the passengers inside the elevator car ("car algorithm").

The method may include determining the reliability of the passenger parameter determined by the car algorithm and controlling further operation of the elevator system based on the result of the car algorithm only if the determined reliability exceeds a predetermined threshold.

As the passengers are usually concentrated in a smaller space inside the elevator car than outside the elevator car, the results of a car algorithm in general are more reliable than the results of a landing algorithm.

In case the result of the landing algorithm does not coincide with the result of the car algorithm, and the result of the car algorithm has a better reliability, the result of the car algorithm may be used, for example by a method applying the principles of machine learning, for improving the landing algorithm. This allows improving the landing algorithm so that the landing algorithm, in the future, will provide results which are sufficiently reliable for modifying the operation of the elevator system even before the passengers boarded an elevator car.

The at least one passenger transport request parameter and the at least one passenger parameter may include the cardinality of a group of passengers associated with the respective control input in order to check whether an input cardinality of a group of passengers coincides with the number of passengers gathering at the respective landing. As mentioned before, the cardinality of a group of passengers refers the size of a group of passengers who like to travel together within the same elevator car.

The at least one passenger transport request parameter and the at least one passenger parameter may include the volume occupancy of at least one passenger associated with the respective control input in order to detect false volume occupancies input by the passengers. As mentioned before, volume occupancy refers to the volume or space occupied by a passenger within the elevator car. The volume occupancy of a passenger may be larger than usual for example because the passenger is traveling with a wheelchair, a bicycle, a pram, a buggy and/or extensive luggage.

The method may further include identifying at least one individual passenger and checking whether all identified passengers associated with a control input have boarded the elevator car to which they are designated, respectively. This allows preventing "piggy-backing", i.e. passengers joining a group of other passengers boarding an elevator car without having entered his or her destination before boarding the elevator car.

The method may further include identifying at least one individual passenger and checking whether any identified passenger entered more than one control input indicating a passenger transport request. This allows enhancing the efficiency and the capacity of the elevator system by preventing unnecessary stops of the elevator car caused by multiple destination inputs provided by the same passenger.

The method may also include identifying repeated calls to the same destination, which have been entered by the same passenger in hopes of achieving an empty elevator car or faster service. This allows enhancing the efficiency and the capacity of the elevator system by preventing unnecessary movements and/or stops of one or more elevator cars.

The method may also include identifying at least one individual passenger and checking whether the at least one identified passenger leaves the elevator car at a landing corresponding with the control input (destination) associated with said passenger. This allows detecting tail-gating, i.e.

passengers leaving the elevator car at a landing which differs from the passenger's previously entered destination.

If tail-gating is detected, an optical and/or acoustical alarm may be issued and/or additional safety measures may be taken. For example, safety doors provided at the respective landings may be closed, in order to avoid passengers from intruding into floors they are not authorized to enter.

The method may include identifying all passengers boarding the elevator car and checking whether all passengers within the elevator car are associated with a control input, respectively. This allows preventing passengers from using the elevator system without having input their respective destinations before boarding one of the elevator cars.

Identifying at least one individual passenger may include identifying said at least one individual passenger by applying methods of body analysis and/or face recognition. Further, machine learning methods may be applied for identifying the at least one individual passenger. Alternatively, the individual passenger may be identified electronically by identifying items carried by the passengers such as RFID chips or mobile phones, in particular mobile phones running appropriate programs ("Apps") which are configured for communicating with the elevator control, for example via WLAN, Bluetooth®, zWave, Zigbee, WiFi, or other known know wireless communications technologies. The program running on a mobile phone may further allow entering control inputs into the elevator system via the mobile phone.

Examples of related methods, which may be employed in an elevator system and in a method according to the present invention, are described in:

Harville, Michael, "Stereo person tracking with adaptive plan-view templates of height and occupancy statistics", Image and Vision Computing 22.2 (2004), pg. 127-142;

Francesco Setti et al., "Group detection in still images by F-formation modeling: a comparative study", In Proceedings of the 2013 14th International Workshop on Image Analysis for Multimedia InteractiveServices (WIAMIS), Paris, France, 3-5 Jul. 2013;

Xuan Zhang et al., "AlignedReID: Surpassing Human-Level Performance in Person Re-Identification", arXiv preprint arXiv:1711.08184, 2017;

Ali H H, et al., "Depth-based human activity recognition: A comparative perspective study on feature extraction", FutureComputing and Informatics Journal (2017), https://doi.org/10.1016/j.fcij.0.2017.11.002.

The recognition of individual passengers, e.g. based on a passenger's face or gait, may be implemented using a one-way function. Such a one-way function provides a result, in particular a numerical result, which allows determining whether two identified passengers are the same person. A one-way function, however, does not allow restoring the raw data, such as an image, of said person from the (numerical) result provided by the one-way function.

In an embodiment of the invention, only the results of said one-way function, but not the original raw data, such as data of images, provided by the at least one sensor are stored within the database in order to allow recognizing previously detected passengers. When such a one-way function is used, no raw data of the passengers is stored. Thus, by using a one-way function, the invention can be implemented in compliance with data protection and privacy requirements.

BRIEF DESCRIPTION OF THE DRAWINGS

In the following, an exemplary embodiment of the invention are described in more detail with respect to the enclosed figures.

DETAILED DESCRIPTION OF THE INVENTION

Figure 1:
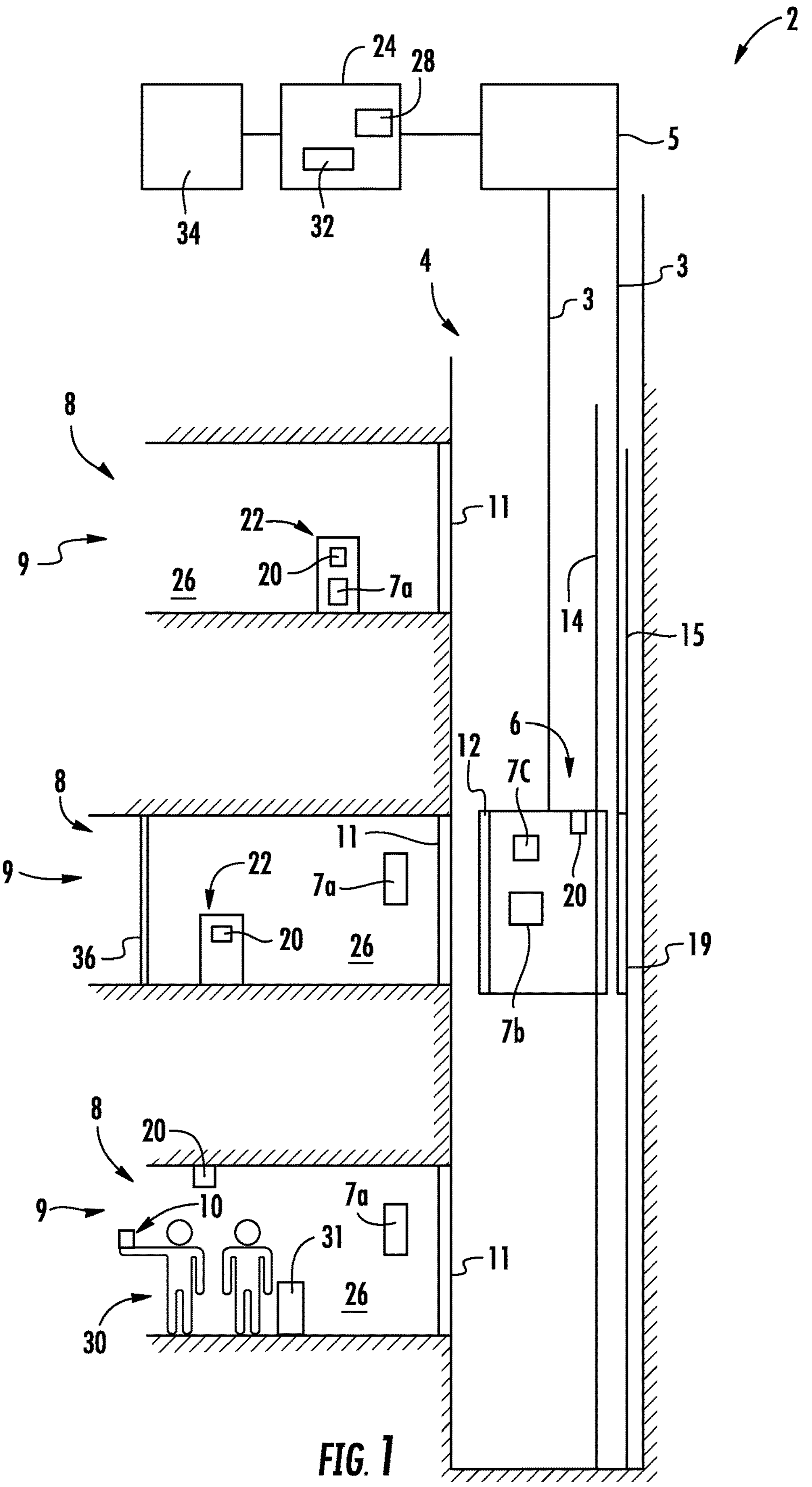
FIG. 1 schematically depicts an elevator system according to an exemplary embodiment of the invention.

FIG. 1 schematically depicts an elevator system 2 according to an exemplary embodiment of the invention.

Exemplary embodiments of two similar but different methods of controlling the operation of the elevator system 2 are described with reference to the flow-charts depicted in FIGS. 2 and 3.

The elevator system 2 includes an elevator car 6 which is movably arranged within a hoistway 4 extending between a plurality of landings 8 located on different floors 9. The elevator car 6 in particular is movable in a longitudinal (vertical) direction along a plurality of car guide members 14, such as guide rails, extending along the vertical direction of the hoistway 4. Only one of said car guide members 14 is depicted in FIG. 1.

Although only one elevator car 6 is shown in FIG. 1, the skilled person understands that exemplary embodiments of the invention may include elevator systems 2 including a plurality of elevator cars 6 moving in one or more hoistways 4.

The elevator car 6 is movably suspended by means of a driving member (tension member) 3. The driving member 3, for example a rope or belt, is connected to an elevator drive 5, which is configured for driving the driving member 3 in order to move the elevator car 6 along the height of the hoistway 4.

Details of the roping configuration are not specified in FIG. 1. The skilled person understands that the type of the roping is not essential for the invention and that different kinds of roping, such as a 1:1 roping, a 2:1 roping or a 4:1 roping may be employed.

The driving member 3 may be a rope, e.g. a steel wire rope, or a belt. The driving member 3 may be uncoated or may have a coating, e.g. in the form of a polymer jacket. In a particular embodiment, the driving member 3 may be a belt comprising a plurality of polymer coated steel cords (not shown). The elevator system 2 may have a traction drive including a traction sheave for driving the driving member 3. In an alternative configuration, which is not shown in the figures, the elevator system 2 may be an elevator system 2 without a driving member 3.

The elevator system 2 also may comprise e.g. a hydraulic drive or a linear drive in place of the driving member 3. The elevator system 2 may have a machine room (not shown) or it may be a machine room-less elevator system 2.

The elevator system 2 further includes a counterweight 19 attached to the driving member 3 and configured for moving concurrently and in opposite direction with respect to the elevator car 6 along at least one counterweight guide member 15. The skilled person will understand that the invention may be applied also to elevator systems 2 which do not comprise a counterweight 19.

Each landing 8 is provided with a landing door 11. The elevator car 6 is provided with a corresponding elevator car door 12 for allowing passengers to transfer between a landing 8 and the interior of the elevator car 6 when the elevator car 6 is positioned at the respective landing 8.

The elevator drive 5 is controlled by an elevator control 24 for moving the elevator car 6 along the hoistway 4 between the different landings 8.

Input to the elevator control 24 may be provided via landing control panels 7*a* provided on each of the landings 8, and/or via an elevator car control panel 7*b* provided inside the elevator car 6. Additionally or alternatively, input to the elevator control may be input using mobile phones ("smartphones") 10 carried by the passengers 30 and running an appropriate software. Mobile phones 10 may communicate directly with the controller 24 through a short range wireless data connection, such as WLAN or Bluetooth®, or through a communications network (local and/or remote), or a combination thereof.

The landing control panels 7*a* and the elevator car control panel 7*b* may be connected to the elevator control 24 by means of electric wires, which are not shown in FIG. 1, in particular by an electric bus, or by means of wireless data connections.

The landing control panels 7*a* may be arranged at a wall 26 next to the respective landing door 11. Additionally or alternatively, landing control panels 7*a* may be located in control kiosks 22 provided on the respective floors 9. The control kiosks 22 may be arranged close to the respective landing doors 11. The control kiosks 22 also may be arranged in some distance from the landing doors 11, in particular if there are different elevator blocks within the building, in order to allow passengers 30 to enter their respective control inputs before reaching the respective landing 8.

The elevator system 2, in particular the elevator control 24, may be configured for controlling the movement of the elevator car applying destination dispatching. When destination dispatching is applied, the landing control panels 7*a* are configured for receiving control inputs including destination requests indicating the destination(s) of the passenger(s) 30 associated with the respective control input. The elevator control 24 is configured for assigning each passenger 30, who has entered a destination request, to an elevator car 6 serving the passenger's destination. Destination dispatching allows distributing the passengers 30 over a plurality of elevator cars 6 so that the transport capacity of the elevator system 2 is optimized. The communication between the passengers 30 and the elevator system 2 can be handled either via the landing/car control panels 7*a*, 7*b* or the control kiosks 22. Alternatively or additionally, it may relay on integration of the passengers' own devices such as mobile phones 10 and similar devices. Connectivity between the elevator system 2 and the mobile devices 10 may be based on Wi-Fi-connections, Bluetooth®-connections and/or NFC sensors.

In a method of controlling the elevator system (see FIGS. 2 and 3), a control input from the passenger(s) is received in a step 100 via the landing control panels 7*a* or a mobile device 10. As mentioned before, the control input comprises information about the destination of the passenger(s) 30 associated with the control input.

The control input may include further information associated with the passengers. Said information may, for example, include the size of a group of passengers 30 intending to travel together in the same elevator car 6 (cardinality) and/or increased volume requirements of the passenger(s) 30. Such increased volume requirements may result from passengers 30 using wheelchairs or traveling with extensive luggage 31. Said extensive luggage 31 may include bicycles, prams, buggies, and the like.

The elevator system 2 further comprises sensors 20, which are configured for detecting the passengers 30 of the elevator system 2. The sensors 20 may be arranged within the elevator car 6 and/or outside the elevator car 6, in particular at or close to one of the landing doors 11.

Sensors 20 configured for detecting passengers 30 also may be located at or within the control kiosks 22 provided on the floors 9.

The sensors 20 may include cameras, which are configured for optically detecting passengers 30 and their luggage 31 including wheelchairs etc. within our outside the elevator car 6. Alternatively or additionally, the sensors 20 may include depth sensors, floor pressure sensors, radar sensors, IR sensors or other sensors, which are capable to detect the passengers 30 and their luggage 31.

A monitoring circuit 28 is provided as part of or separately from the elevator control 24. The monitoring circuit 28 may be provided locally or within a virtual cloud. The monitoring circuit 28 is configured for receiving signals from the sensors 20 and for determining (in step 200 depicted in FIGS. 2 and 3) from the received signals at least one passenger parameter associated with the detected passenger(s) 30.

Said passenger parameter may include the cardinality (size) of a group of passengers 30 gathering at a landing 8 for traveling together in a single elevator car 6. Alternatively or additionally, the passenger parameter may include volume requirements of the passengers 30, i.e. volume requirements which are larger than the typical volume requirements of passengers 30 of an elevator system 2.

Additionally or alternatively, the monitoring circuit 28 may be configured for recognizing and/or identifying individual passengers 30 based on the signals received from the sensors 20, for example by applying methods of face recognition and/or gait recognition. This also may include applying machine learning methods.

When a passenger 30 has been identified, the control input entered by the respective passenger 30 is associated with said passenger 30, i.e. the passenger 30 and the associated control input are linked with each other.

The monitoring circuit 28 may be configured for checking whether any identified passenger 30 input more than one control input indicating a passenger transport request. Identifying and ignoring multiple control inputs from the same passenger 30 allows enhancing the efficiency and the capacity of the elevator system 2 by preventing unnecessary stops of the at least one elevator car 6 caused by multiple control inputs from the same passenger 30.

The monitoring circuit 28 may further be configured for identifying repeated calls to the same destination, which have been entered by the same passenger 30 in order to achieve an empty elevator car 6 or a faster service. Identifying and ignoring repeated calls to the same destination input by the same passenger 30 allows enhancing the efficiency and the capacity of the elevator system 2 by preventing an inefficient scheduling of the elevator car(s) 6 caused by multiple control inputs from the same passenger 30.

The elevator system 2 further comprises a comparator 32, which is configured for comparing the parameter(s) associated with a control input with corresponding parameter(s) determined by the monitoring circuit 28 from the signals received from at least one of the sensors 20. This is done in step 400 shown in FIGS. 2 and 3. (Steps 300 to 350 depicted in FIGS. 2 and 3 will be discussed further below.)

In case the parameter(s) associated with a control input correspond, within a given tolerance, with the corresponding parameter(s) detected and/or determined by the monitoring circuit 28, the elevator control 24 proceeds with operating the elevator system 2 in accordance with the received control input. This is illustrated as step 500 in FIGS. 2 and 3.

Figure 2:
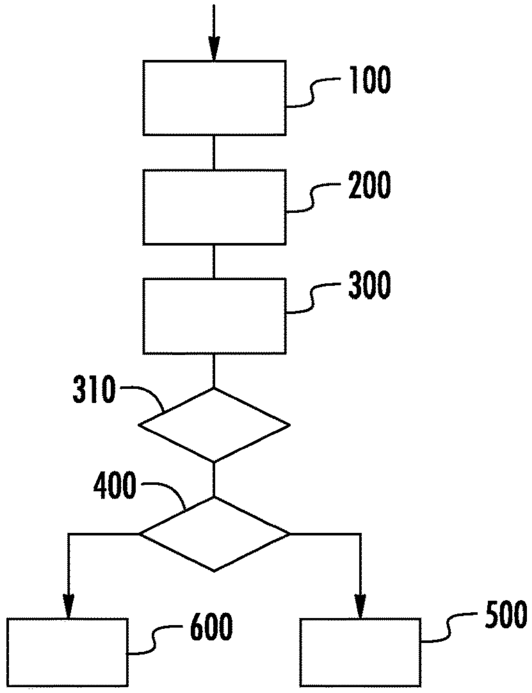
FIG. 2 depicts a flow chart of a method of controlling operation of an elevator system according to an embodiment of the invention.
Figure 3:
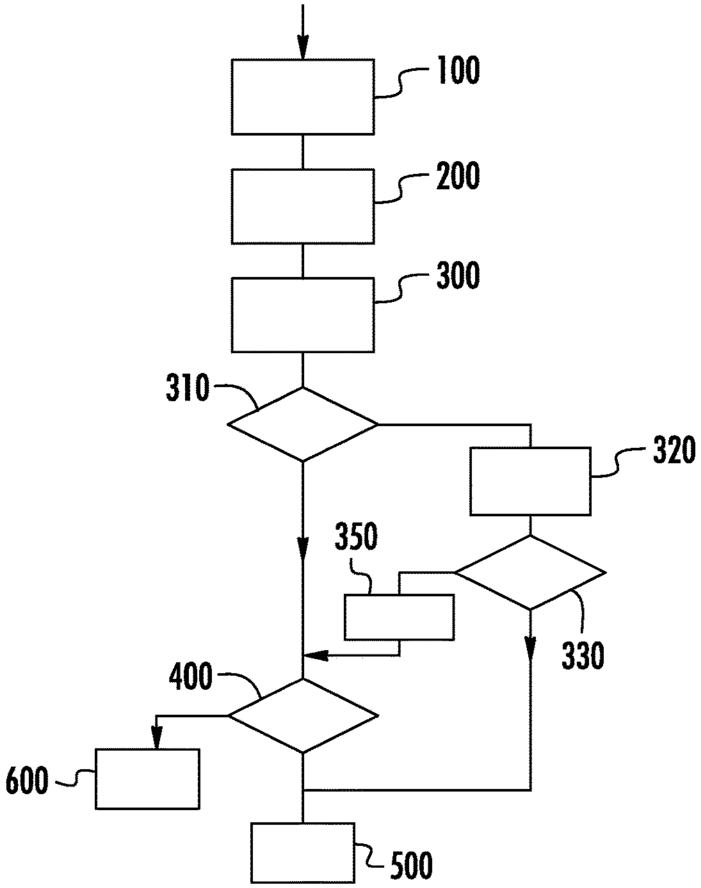
FIG. 3 depicts a flow chart of a method of controlling operation of an elevator system according to another embodiment of the invention.

In case, however, at least one of the parameter(s) associated with a control input considerably differs by more than the given tolerance from the corresponding parameter detected and/or determined by the monitoring circuit 28, the elevator control 24 will deviate from normal operation in order to react to the detected deviation (step 600 in FIGS. 2 and 3).

For example, a control input, which was input via one of the control panels 7*a*, 7*b*, may be ignored if at least one of the parameters associated with said control input differs by more than a predetermined threshold from the corresponding parameter detected and/or determined by the monitoring circuit 28.

A control input in particular may be ignored if the difference between a cardinality of a group of passengers 30 intending to travel in the same elevator car 6, which was entered together with the control input, and the cardinality of said group of passengers 30, as it has been detected and/or determined by the monitoring circuit 28 from signals received from at least one of the sensors 20, is larger than a given threshold. By ignoring said control input, inefficient operation, which would be caused by the erroneous control input, may be prevented.

The threshold may be set as an absolute value, e.g. as number of passengers 30 of a group or the absolute space given in m2, m3, ft2, or ft3, needed for extra luggage. The threshold, for example, may correspond to a deviation of one, two, three or more passengers. Alternatively, the threshold may be set as a percentage of the input parameter. I.e., the threshold may correspond to a deviation of 10%. 20%. 30%, 40%, 50% or more percent of the space requested with the respective control input.

The threshold may depend on different parameters, like the impact on time, the type of building and its use, i.e. whether it is a commercial building, an office building or a residential building. The threshold therefore may be adjusted individually to the respective building.

For example, if a passenger 30 states that he is traveling with a group of seven people, but only four passengers 30 are detected at the respective landing 8, such a discrepancy of about 40% may be ignored during off-peak hours. However, during peak-hours, such as in the morning and/or in the evening, when many people use the elevator system 2 simultaneously, any discrepancy of more than 20% will not be ignored, but the control input causing such a discrepancy will be ignored or adjusted to the detected size of the group of passengers 30.

Similarly, in case an increased volume occupancy of one or more passengers 30 is not confirmed by the monitoring circuit 28, a request to satisfy the demand for such an increased volume occupancy may be ignored. By ignoring an unconfirmed demand for an increased volume occupancy, an unnecessary low occupancy of an elevator car 6 due to a falsely requested demand for an increased volume may be avoided. As a result, the elevator system 2 may be operated more efficiently.

Further, any passenger 30 entering a control input indicating a desired destination floor 9 via a landing control panel 7*a* may be identified. After the elevator car 6 assigned to the respective passenger 30 by the dispatching algorithm has arrived at the passenger's floor 9, the monitoring circuit 28 may check whether the passenger 30, who has entered the control input, boards the elevator car 6. In case it is determined that the passenger 30 did not board the elevator car 6 and/or left the landing 8, the passenger's control input may be ignored. This avoids unnecessary stops of the elevator car 6 at destination floors 9 input by passengers 30 which did not board the elevator car 6. Avoiding unnecessary stops of the elevator car 6 enhances the efficiency of the elevator system 2 and improves the travel experience of the other passengers 30.

Alternatively or additionally, the monitoring circuit 28 may check whether as single passenger 30 entered more than one control input. In case more than one control input has been entered by the same passenger 30, the elevator control 24 may be configured for ignoring all control inputs entered by said passenger 30 except for the control input entered last. Again, the efficiency of the elevator system 2 is enhanced since unnecessary stops of the elevator car 6 are avoided by ignoring multiple destinations entered by the same passenger 30. It also prevents gaming from multiple calls entered by the same passenger 30 to the same floor 9.

In order to enhance the operational reliability of the elevator system 2, the monitoring circuit 28 may be configured for determining a reliability value indicating the reliability of the determined passenger parameter.

In such a configuration, the monitoring circuit 28 predicts a value, such as a cardinality of a group of passengers 30, a volume of the space occupied by a passenger 30 and his luggage 31, a logic (yes or no) value indicating whether the same passenger 30 called the same elevator car 6 several times, etc., with a certain probability. For example, the monitoring circuit 28 may predict that a passenger 30 requesting extra space for a wheelchair does not need said extra space since he does not use a wheelchair with a reliability value indicating a probability of 90%. A reliability value indicating a probability of 90% indicates that, based on the currently available information, in 9 out of 10 occasions the passenger 30 does not need the requested extra space.

This is illustrated as step 300 in FIGS. 2 and 3. The monitoring circuit 28 further may be configured for comparing the determined reliability value with a predefined threshold (step 310 in FIGS. 2 and 3) in order to modify the operation of the elevator system 2 based on the determined passenger parameter (in step 600) only in case the determined reliability value of said passenger parameter exceeds the predefined threshold.

In case the determined reliability value does not exceed the predefined threshold, the control input provided by the passenger 30 is trusted and the elevator system 2 is controlled (in step 500) according to said control input.

Due to the restricted space, determining passenger parameters of passengers 30 within the elevator car 6 is often easier and more reliable than determining passenger parameters of passengers 30 outside the elevator car 6.

Thus, according to an exemplary embodiment of the invention which is illustrated in FIG. 3, in a first step (step 300 in FIG. 3), the at least one passenger parameter and its reliability are determined when the passenger(s) 30 are still outside the elevator car 6, e.g. at one of the landings 8 ("landing algorithm").

It is checked, whether the determined passenger parameter(s) deviate from the corresponding parameter input by the passenger(s) (step 400), and if the reliability value(s) of the results of the landing algorithm exceed the predefined threshold, the control of the elevator system 2 is modified according to the determined passenger parameter(s) (step 600 in FIG. 3) in case a sufficiently large deviation is detected.

If the reliability value(s) of the results of the landing algorithm do not exceed the predefined threshold, the passenger parameter(s) and the corresponding reliability values are determined again based on signals received from sensors 20 within the elevator car 6 ("car algorithm") after the passenger(s) 30 associated with the respective control input boarded the elevator car 6 (step 320 in FIG. 3).

In step 330 it is checked whether the reliability value(s) determined from the car algorithm exceed the predefined threshold.

If the reliability value(s) determined from the car algorithm exceed the predefined threshold, the method proceeds with step 400, as it has been described before, using the passenger parameter(s) determined by the car algorithm instead of the passenger parameter(s) determined by the landing algorithm.

Due to the increased reliability of the car algorithm, step 330 of checking whether the reliability value(s) determined from the car algorithm exceed the predefined threshold is optional. If the reliability of the results provided by the car algorithm is considered to be always sufficient, step 330 may be omitted and the method may proceed directly with step 400.

The results achieved by the car algorithm also may be used for improving the landing algorithm, e.g. by methods including machine learning (step 350 in FIG. 3).

A machine learning algorithm learns from a so called training set (e.g. pairs image/number of people in the image), and applies the result of said learning process to new data, for example to a new image, by stating the number of people in the image. Any time an external entity, such as a person or more reliable algorithm, tells the machine learning algorithm whether its prediction was correct or not, and in case it is not what was the correct answer, this new pair of image and the correct answer, becomes part of the training set, thereby enlarging the training set. The machine learning algorithm can then re-train itself based on this new training dataset, in order to become more precise. The step of re-training can be repeated many times in order to enhance the quality and the reliability of the results provided by the algorithm.

Again, similar to the method illustrated in FIG. 2, the passenger parameter(s) 30 determined by the "car algorithm" are ignored and the elevator system is controlled based on the control input provided by the passenger(s) 30 (step 500), if the reliability value(s) determined from the car algorithm does not exceed the predefined threshold.

An elevator system 2 comprising an elevator control 24 in accordance with an exemplary embodiment of the invention also may be used for controlling access of the passengers 30 to the different floors 9.

Figure 4:
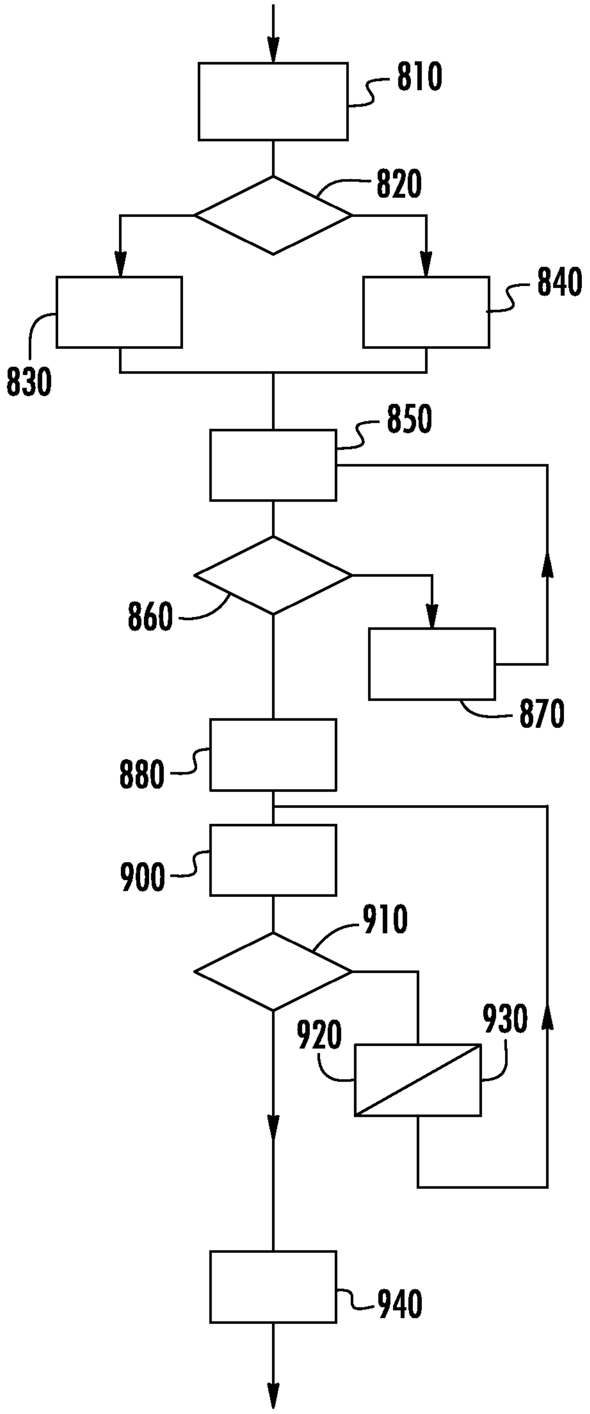
FIG. 4 depicts a flow chart of a method of controlling operation of an elevator system, wherein the elevator system used for access control.

FIG. 4 depicts an exemplary flow chart of a method of controlling operation of an elevator system 2, in which the elevator system 2 is employed as an access control system.

In order to be used for access control, the elevator control 24 comprises, or has access to, a database 34 (see FIG. 1), in which information about previously identified passengers 30 is stored.

The database 34 may be integrated as part of the IT infrastructure of the building housing the elevator system 2 to be administered under the responsibility of building owner. Such a database may be coupled to external remote services, such as cloud services, as far as the passenger's privacy is properly handled. The database 34 contains digital anonymous identities of known passengers 30. An identity for example includes: (1) a set of anonymous and numerical features corresponding to the identity of the respective passenger 30, i.e. embedding. These features cannot be reversed for obtaining any relevant personal data. (2) a log file of the journeys of the respective passenger 30 comprising a timestamp, the departure floor 9 and the destination floor 9 of the respective journey. Classically, features are extracted by means of facial recognition or behavioral analysis, see e.g. Vezzani, Roberto, Davide Baltieri, and Rita Cucchiara. "People reidentification in surveillance and forensics: A survey." ACM Computing Surveys (CSUR) 46.2 (2013): 29.

When a passenger 30 approaches one of the landings 8 of the elevator system 2, the passenger 30 is detected by at least one of the sensors 20 in step 810 shown in FIG. 4, and the database 34 is queried in step 820 for an entry corresponding to the information about said passenger 30 derived from the signals provided from the sensors 30. Alternatively or additionally, the passenger 30 may be identified based on data received from a device, such as a smart phone 10 or an RFID chip, carried by the respective passenger 30.

If an entry corresponding to the passenger 30 is found within the database 34, the passenger 30 is welcomed and a control input, which is based on the information stored within the database, is generated (step 830). Said information in particular may include the usual destination of the identified passenger 30.

Optionally, the passenger 30 may be allowed to change the control input, in particular his destination, e.g. via a landing control panel 7*a*. In case the passenger 30 is not allowed to access all floors 9, only the allowed floors 9 may be offered as potential destinations to the passenger 30.

In case no entry matching the passenger 30 is found within the database 34, the passenger 30 may be invited to identify/authorize himself and to enter his desired destination (step 840). The access of unknown passengers 30 may be restricted to selected floors 9, which are open to the public. Alternatively, the transportation of unknown passengers 30 may be denied.

In order to avoid that passengers 30, who did not identify themselves and/or who did no enter their destination via a landing control panel 7*a*, join other passengers 30 when boarding the elevator car 6 in order to be transported to one of the floors 9 without having been recognized and checked ("piggy-backing"), the passengers 30 are identified again after having boarded an elevator car 6 (step 850), and it is checked (step 860) whether all passengers 30 present within the elevator car 6 entered a control input.

In case the monitoring circuit 28 detects that at least one passenger 30, who has not been identified and/or who did not enter his destination, boarded the elevator car 6, the elevator control 24 does not start moving said elevator car 6 (step 870). Instead of moving the elevator car 6, the at least one passenger 30 or all passengers 30 within the elevator car 6 are requested to leave the elevator car 6 in order to (re-) enter his/her/their respective destination call(s) via a landing control panel 7*a* or the car control panel 7*b*. The passengers 30 may be requested to leave the elevator car 6 by means of an acoustical announcement played within the elevator car 6, by an optical message displayed within the elevator car 6, e.g. on a display screen 7*c* provided within the elevator car 6, or by a combination thereof.

On the other hand, the elevator system 2 is operated normally according to the input control inputs (step 880), if all passengers 30 within the elevator car 6 have been identified as having entered a valid control input before boarding the elevator car 6.

Similarly, in order to avoid that passengers 30 leave the elevator car 6 at floors 9 which differ from the destinations entered by the respective passengers 30 ("tail-gating"), the passengers 30 are monitored and identified again when leaving the elevator car 6 at one of the landings 8 (step 900), and it is checked in step 910 whether the destination floor 9 entered by each passenger 30 leaving the elevator car 6 corresponds with the floor 9 of the respective landing 8.

This functionality can be implemented using sensors 20, in particular cameras, within the elevator car 8 and on the floors 9. In particular, the same sensors 20 that are used for monitoring passengers 30 within or outside the elevator car 6 and determining at least one passenger parameter, as it has been described before, may be used.

When a passenger 30 entered a control input via a landing/car control panel 7*a*, 7*b*, said control input may be associated with sensor data, e.g. an image, of the passenger 30. By comparing sensor data received from the sensors 20 when the passenger 30 is leaving the elevator car 6 with the previously stored sensor data associated with said passenger 30, the elevator control 24 is able to check whether the passenger 30 leaves the elevator car 6 at the landing 8/floor 9 corresponding with landing 8/floor 9 provided with the control input.

The elevator control 4 may be configured to issue an alarm signal ("intrusion alarm") (step 920) in case tail-gaiting has been detected as the destination floor 9 entered by a passenger 30 leaving the elevator car 6 does not correspond with the floor 9 of the respective landing 8 and the passenger 30 is not authorized to enter the respective floor 9.

In order to prevent unauthorized passenger(s) from intruding into floors 9 they are not allowed to enter, additionally or alternatively to issuing an alarm signal, safety doors 36 provided at the respective floors 9 may be closed (step 930) in case an intrusion has been detected. The safety doors 36 may remain closed until the unauthorized passenger(s) 30 re-boarded the elevator car 6 and/or security personnel arrives at the scene in order to clarify the situation.

In case the passenger 30 is allowed to leave the elevator car 6 at the respective floor 9 although he did not enter the respective floor 9 as his destination, no alarm is issued, but the passenger's 30 control input is deleted in order to avoid an unnecessary stop of the elevator car 6 at the passenger's previously entered destination.

For example, when the passenger 30 input floor 9 number 7 has his destination, but then leaves the elevator car 6 at floor 9 number 5, the elevator control 24 will not cause the elevator car 6 to stop at floor 9 number 7 anymore, unless there is still at least one (other) passenger 30 within the elevator car 6 who entered floor 9 number 5 as his destination or a passenger 30 waiting at floor 9 number 7 is supposed to enter the elevator car 6.

The elevator system 2 continues operating normally according to the control inputs (step 940), if all passengers 30 leaving the elevator car 6 at one of the floors 9 are identified as having entered a control input including said floor 9 as their destination.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention shall not be limited to the particular embodiment disclosed, but that the invention includes all embodiments falling within the scope of the dependent claims.

What is claimed is:

1. Method of controlling operation of an elevator system (2) comprising:

a hoistway (4) extending between a plurality of landings (8) situated on different floors (9); and at least one elevator car (6) configured for moving along the hoistway (4) between the plurality of landings (8);

wherein the method includes:

receiving a control input indicating a passenger transport request, the control input comprising at least one passenger transport request parameter;

monitoring passengers (30) within or outside the elevator car (6) and determining at least one passenger parameter associated with the passengers (30);

comparing the at least one passenger transport request parameter with the at least one passenger parameter; and controlling further operation of the elevator system (2) based on the result of said comparison;

wherein controlling further operation of the elevator system (2) includes ignoring the received control input if the at least one passenger transport request parameter does not coincide with the at least one passenger parameter.

2. Method according to claim 1, wherein the method further includes determining the reliability of the determined passenger parameter and controlling further operation of the elevator system (2) based on the result of the comparison only if the determined reliability exceeds a predetermined threshold.

3. Method according to claim 1, wherein controlling further operation of the elevator system (2) includes operating the elevator system (2) according to the received control input if the at least one passenger transport request parameter coincides with the at least one passenger parameter.

4. Method according to claim 1, wherein controlling further operation of the elevator system (2) includes issuing an alarm if the at least one passenger transport request parameter does not coincide with the at least one passenger parameter.

5. Method according to claim 1, wherein the at least one passenger transport request parameter and the at least one passenger parameter include a cardinality of a group of passengers (30) associated and/or a volume occupancy of at least one passenger (30) with the respective control input.

6. Method of controlling operation of an elevator system (2) comprising:

a hoistway (4) extending between a plurality of landings (8) situated on different floors (9); and at least one elevator car (6) configured for moving along the hoistway (4) between the plurality of landings (8);

wherein the method includes:

receiving a control input indicating a passenger transport request, the control input comprising at least one passenger transport request parameter;

monitoring passengers (30) within or outside the elevator car (6) and determining at least one passenger parameter associated with the passengers (30);

comparing the at least one passenger transport request parameter with the at least one passenger parameter; and controlling further operation of the elevator system (2) based on the result of said comparison;

wherein the method includes identifying at least one individual passenger (30) and checking whether all identified passengers (30) associated with a control input have boarded the elevator car (6).

7. Method of controlling operation of an elevator system (2) comprising:

a hoistway (4) extending between a plurality of landings (8) situated on different floors (9); and at least one elevator car (6) configured for moving along the hoistway (4) between the plurality of landings (8);

wherein the method includes:

receiving a control input indicating a passenger transport request, the control input comprising at least one passenger transport request parameter;

monitoring passengers (30) within or outside the elevator car (6) and determining at least one passenger parameter associated with the passengers (30);

comparing the at least one passenger transport request parameter with the at least one passenger parameter; and controlling further operation of the elevator system (2) based on the result of said comparison;

wherein the method includes identifying at least one individual passenger (30) and checking whether any identified passenger (30) entered more than one control input indicating a passenger transport request.

8. Method according to claim 1, wherein the method includes identifying at least one individual passenger (30) and checking whether the at least one identified passenger (30) leaves the elevator car (6) at a landing (8) corresponding with the control input associated with said passenger (30).

9. Method according to claim 1, wherein the method includes identifying all passengers (30) boarding the elevator car (6) and checking whether all passengers (30) within the elevator car (6) are associated with a control input, respectively.

10. Method according to claim 6, wherein identifying at least one individual passenger (30) includes identifying said at least one individual passenger (30) by body analysis and/or by face recognition; wherein identifying the at least one individual passenger (30) in particular includes applying machine learning methods.

11. Elevator system (2) comprising:

a hoistway (4) extending between a plurality of landings (8) situated on different floors (9);

an elevator car (6) configured for moving along the hoistway (4) between the plurality of landings (8);

an elevator drive (5) configured for moving the elevator car (6) along the hoistway (4); and an elevator control (24) configured for controlling operation of the elevator system (2) by controlling the elevator drive (5);

wherein the elevator control (24) is configured for controlling operation of the elevator system (2) by applying a method according to claim 1.

12. Elevator system (2) according to claim 11 further comprising at least one sensor (20), in particular a camera, which is configured for monitoring the passengers (30) within and/or outside the elevator car (6).

13. Elevator system (2) according to claim 12, wherein the at least one sensor (20) is located within the elevator car (6), at one of the landings (8) outside the elevator car (6), and/or in a control kiosk (22) arranged on one of the floors (9).

14. Elevator system (2) according to claim 11, further comprising at least one safety door (36) at at least one of the landings (8) which may be closed in order to prevent unauthorized passengers (30) from entering the respective floor (9).

* * * * *